United States Patent [19]

Gerkin et al.

[11] Patent Number: 4,904,705

[45] Date of Patent: Feb. 27, 1990

[54] POLYUREA FOAMS MADE FROM N-(POLYOXYALKYL)-N-(ALKYL)AMINES

[75] Inventors: Richard M. Gerkin; Michael W. Jorgenson, both of Cross Lanes, W. Va.

[73] Assignee: Union Carbide Chemicals and Plastics Company Inc., Danbury, Conn.

[21] Appl. No.: 176,302

[22] Filed: Mar. 31, 1988

Related U.S. Application Data

[63] Continuation-in-part of Ser. No. 67,818, Jun. 30, 1987, abandoned.

[51] Int. Cl.$^4$ .................. C08G 18/00; C08G 18/14
[52] U.S. Cl. ................................ 521/163; 521/164; 521/167
[58] Field of Search .................. 521/163, 164, 167

[56] References Cited

U.S. PATENT DOCUMENTS

| | | | |
|---|---|---|---|
| Re. 28,715 | 2/1976 | Stamberger | 521/137 |
| Re. 29,118 | 2/1977 | Stamerger | 521/137 |
| 2,160,058 | 5/1939 | Covert | 564/291 |
| 2,629,740 | 2/1953 | Carnes | 564/487 |
| 2,636,902 | 4/1953 | Taylor | 564/446 |
| 2,888,439 | 5/1959 | Simons | 252/453 |
| 2,888,440 | 5/1959 | Frazer | 525/461 |
| 3,152,998 | 10/1964 | Moss | 502/315 |
| 3,179,606 | 4/1965 | Prescott | 521/159 |
| 3,231,619 | 1/1966 | Speranza | 252/117 |
| 3,236,895 | 2/1966 | Lee | 252/73 |
| 3,256,213 | 6/1966 | Gmitter | 524/726 |
| 3,267,050 | 8/1966 | Kuryla | 521/163 |
| 3,269,999 | 8/1966 | Moore | 106/14.18 |
| 3,309,182 | 3/1967 | Crowley | 44/72 |
| 3,347,926 | 10/1967 | Zech | 544/78 |
| 3,352,916 | 11/1967 | Zech | 252/541 |
| 3,359,243 | 12/1967 | Criner | 524/726 |
| 3,373,204 | 3/1968 | Hales | 564/347 |
| 3,383,417 | 5/1968 | Lichtenwalter | 5/55 R |
| 3,390,184 | 6/1968 | Moss | 564/480 |
| 3,436,359 | 4/1969 | Hubin | 521/163 |
| 3,580,952 | 5/1971 | Moschel | 564/467 |
| 3,625,871 | 12/1971 | Traubel | 264/41 |
| 3,645,969 | 2/1972 | Harvey | 502/167 |
| 3,654,370 | 4/1972 | Yeakey | 544/162 |
| 3,660,319 | 5/1972 | Yeakey | 521/115 |
| 3,666,788 | 5/1972 | Rowton | 564/504 |
| 3,714,128 | 1/1973 | Rowton | 521/163 |
| 3,832,323 | 8/1974 | Ramey | 252/182.26 |
| 3,838,076 | 9/1974 | Moss | 521/163 |
| 3,847,992 | 11/1974 | Moss | 521/164 |
| 4,062,820 | 12/1977 | Mitchell | 260/405.5 |
| 4,075,130 | 2/1978 | Nayler | 252/89.1 |
| 4,115,361 | 9/1978 | Schulze | 525/523 |
| 4,118,422 | 10/1978 | Klein | 544/98 |
| 4,119,615 | 10/1978 | Schulze | 428/474.4 |
| 4,146,700 | 3/1979 | Waddill | 525/504 |
| 4,146,701 | 3/1979 | Waddill | 525/523 |
| 4,152,353 | 5/1979 | Habermann | 564/374 |
| 4,153,581 | 5/1979 | Habermann | 252/472 |
| 4,180,644 | 12/1979 | Marquis | 528/68 |
| 4,184,024 | 1/1980 | Klein | 521/167 |
| 4,191,706 | 3/1980 | Marquis | 528/73 |
| 4,247,301 | 1/9181 | Honnen | 44/63 |
| 4,269,945 | 5/1981 | Vanderhider | 521/167 |
| 4,286,074 | 8/1981 | Davis | 521/137 |
| 4,304,889 | 12/1981 | Waddill | 525/514 |
| 4,332,720 | 6/1982 | Schulze | 521/128 |
| 4,390,645 | 6/1983 | Hoffman | 521/137 |
| 4,396,729 | 8/1983 | Dominguez | 264/45.3 |
| 4,417,075 | 11/1983 | Stobryn | 564/476 |
| 4,431,754 | 2/1984 | Hoffman | 521/137 |
| 4,431,790 | 2/1984 | Umeda | 528/73 |
| 4,433,067 | 2/1984 | Rice | 521/57 |
| 4,444,910 | 4/1984 | Rice | 521/124 |
| 4,448,904 | 6/1984 | Dominguez | 521/160 |
| 4,456,730 | 6/1984 | Balle | 524/839 |
| 4,471,138 | 9/1984 | Stobryn | 564/476 |
| 4,474,900 | 10/1984 | Dominquez | 521/110 |
| 4,474,901 | 10/1984 | Dominguez | 521/163 |
| 4,487,908 | 12/1984 | Dominquez | 528/48 |
| 4,487,912 | 12/1984 | Zimmerman | 528/76 |
| 4,499,038 | 2/1985 | Schafer et al. | 264/51 |
| 4,499,254 | 2/1985 | Dominguez | 528/77 |
| 4,506,039 | 3/1985 | Balle | 521/137 |
| 4,513,133 | 4/1985 | Domiguez | 528/48 |
| 4,526,972 | 7/1985 | Speranza | 546/186 |
| 4,530,941 | 7/1985 | Turner | 521/161 |
| 4,532,266 | 7/1985 | Rasshofer | 521/134 |
| 4,540,720 | 9/1985 | Rasshofer | 521/159 |
| 4,588,840 | 5/1986 | Gurgiold | 564/443 |
| 4,605,773 | 8/1986 | Maloney | 564/476 |
| 4,642,320 | 2/1987 | Turner | 521/133 |
| 4,686,242 | 8/1987 | Turner | 521/137 |
| 4,705,814 | 11/1987 | Grigsby | 521/160 |
| 4,732,919 | 3/1988 | Grigsby | 521/159 |
| 4,845,133 | 7/1989 | Priester et al. | 521/167 |

FOREIGN PATENT DOCUMENTS

| | | |
|---|---|---|
| 147812 | of 1985 | European Pat. Off. . |
| 3147736 | 6/1983 | Fed. Rep. of Germany . |
| 1466708 | 12/1966 | France . |
| 1567293 | of 1969 | France . |
| 60-4519 | 2/1985 | Japan . |
| WO86/05795 | of 1986 | PCT Int'l Appl. . |
| 1033912 | 6/1966 | United Kingdom . |
| 1159962 | 7/1969 | United Kingdom . |

OTHER PUBLICATIONS

Amines Via Exchange Reactions, H. Glaser, Houben-Weyl, Methoden der Organischen Chemie, vol. XI/1 (1957), pp. 126–134.

Primary Examiner—John Kight
Assistant Examiner—Dennis R. Daley
Attorney, Agent, or Firm—Paul W. Leuzzi

[57] ABSTRACT

Polyurea foams are prepared by the reaction of N-(polyoxyalkyl)-N-(alkyl)amines with organic isocyanates in the presence of a suitable catalyst.

30 Claims, No Drawings

POLYUREA FOAMS MADE FROM N-(POLYOXYALKYL)-N-(ALKYL)AMINES

This is a continuation-in-part of U.S. patent application Ser. No. 07/067,818, filed on June 30, 1987, now abandoned.

BACKGROUND OF THE INVENTION

1. Field of the Invention

The present invention relates to polyurea and polyurea/polyurethane hybrid foams made from N-(polyoxyalkyl) N-(alkyl)amines. These polyurea foams have utility in molded foam applications such as automotive seating as well as in slabstock foam which is often used as carpet underlay or in furniture applications.

2. Prior Art

Urethane technology as practiced today offers end users a versatility unsurpassed by virtually any other polymer technology. Readily available intermediates and processing equipment now allow easy preparation of solid elastomers ranging from very low to very high hardness, and foamed products ranging from one half to thirty pounds per cubic foot in density. The properties of these materials are generally very good, and large markets have evolved around their use.

The products of primary interest in the present invention are foams. Historically, urethane foams have been prepared by carefully controlled reaction of a number of important ingredients including: a polyol, water, an isocyanate, catalysts, silicone surfactant and (optionally) added blowing agent.

Polyols in early systems were generally based on propylene oxide. Improvements in economics and in processing were achieved by adding various amounts of ethylene oxide to these polyols, generally in the polyol backbone. Polyols such as these contained secondary hydroxyl groups, and consequently, were slow to react in the foaming system. Subsequent studies showed that significant improvement in the overall cure characteristics of a given system could be attained by converting some of the secondary hydroxyl groups on the polyol to more highly reactive primary hydroxyls by "capping" the polyol with ethylene oxide rather than placing the ethylene oxide in the backbone. Polyols such as these are described in U.S. Pat. Nos. 3,336,242 and 3,535,307. They have found an important place in the flexible foam industry largely because of their greater reactivity.

Even with the success these materials have enjoyed, areas for improvement remain. One of these is the general area of foam productivity, i.e., reactivity. One way to increase the reactivity in these types of intermediates is to replace the primary hydroxyl groups with the highly reactive amine group. Such polyethers are known in the art and are described in U.S. Pat. 3,654,370. They are primary amine terminated polyethers made by amination of an appropriate polyether polyol with ammonia. Unfortunately, it has proven very difficult to use these highly reactive amines to prepare foams. In fact, several patents teach that these primary amine terminated polyethers are too reactive in various foam applications. See for instance U.S. Pat. Nos. 3,838,076; 3,847,992; and 3,979,364.

Additional art discussing the potential utility of amine polyethers include:

U.S. Pat. No. 3,179,606 focuses on a cellular urethane product from a foamable mixture comprised of a major portion of a polyoxyalkylene polyol, an isocyanate, a catalyst and up to 50 weight percent of a primary amine containing polyamine derived from reaction of a polyglycol and either ammonia or polyalkylene polyamines.

U.S. Pat. No. 3,267,050 teaches a foam from reaction of a polyisocyanate, a blowing agent, a catalyst, and an admixture of a polyol and up to 15% of an amine terminated polyol. The amine is a specially prepared material made by reaction of a conventional polyol with acrylonitrile followed by reduction of the remaining nitrile group to the corresponding primary amine.

U.S. Pat. No. 3,838,076 teaches a cellular polyurethane formed by reacting, in the presence of a blowing agent, an organic polyisocyaaate and a partially aminated polyol wherein 10 to 50% of the hydroxyl groups have been replaced by primary amine groups.

U.S. Pat. 4,286,074 describes graft polymer dispersions of free radically polymerized ethylenically unsaturated monomers in an amine terminated polyoxyalkylene polyether polymer. The amine terminated polyether exemplified are primary or secondary amine containing materials with a maximum equivalent weight of 1000.

Also, the reaction of a primary amine with an alcohol (polyol) is a known approach. However, U.S. Pat. No. 4,686,242 teaches that this approach actually produces an amine terminated polyether where the amine groups are predominantly primary amines.

Two features of the prior art described above are significant relative to the foams which are the subject of this invention. The first is that the amines evaluated in these patents are generally primary amines. The only exception involves U.S. Pat. 4,286,074 where a low molecular weight difunctional amine is disclosed but not evaluated in any application. The second is that these primary amines are never used as 100% of the polyoxyalkylene component. Either the polyether itself is only partially aminated, or the amine terminated polyether is used as a blend in a conventional polyol. One reason for this blend approach may well be the very high reactivity of amine terminated polyethers. Blending with a polyol or using only partial amination would essentially dilute the highly reactive amine, allowing its use. In fact, our recent work confirms it is virtually impossible to prepare a foam using a commercially available 5000 MW primary amine terminated polyether at a level of 100% in the formulation.

Quite unexpectedly, it has been found that a new class of amines identified as N-(polyoxyalkyl)-N-(alkyl)amines can be used to prepare foams using standard preparative techniques. No problems associated with high reactivity were observed. In fact, the foaming system handled more like a conventional polyol foam than one based on a reactive amine. Unlike "urethane" foams prepared using the conventional polyol approach, the foams prepared using N-(polyoxyalkyl)-N-(alkyl)amines can be pure polyurea foams (i.e., the foam contains essentially no urethane bonds in its structural backbone). In addition, these novel new amines can be used in blends with other reactive foam ingredients to provide further reactivity control and hybrid systems.

OBJECT OF THE INVENTION

It is an object of the present invention to provide polyurea and polyurea/polyurethane hybrid foams made by the reaction of N-(polyoxyalkyl) N (alkyl)amines with isocyanates.

Another object of the present invention is to provide a process for preparing such polyurea foams which is not characterized by too high a rate of reactivity.

Other objects of the invention will be made apparent from the description and examples which follow.

SUMMARY OF THE INVENTION

The present invention provides a polyurea and polyurea/polyurethane hybrid foam made by the reaction of N-(polyoxyalkyl) N-(alkyl)amines with isocyanates.

DETAILED DESCRIPTION OF THE INVENTION

In accordance with the present invention there is provided N-(polyoxyalkyl)-N (alkyl)amines of the general formula:

$$R[H]_{(hz)}[(P)_p(S)_s(T)_t]_{z-(hz)}$$

wherein R is an initiator radical based on a compound containing Zerewitinoff active hydrogen atoms. Such compounds are capable of initiating polymerization with alkylene oxides when used with a suitable catalyst (e.g., potassium hydroxide, zinc hexacyanocobaltate).

Examples of such compounds include but are not limited to: monofunctional compounds such as methanol, butanol, phenol, nonylphenol, lauryl alcohol, 2-methoxyethanol; difunctional compounds such as ethylene glycol, propylene glycol, water, 1,4-butanediol, diethylene glycol; trifunctional compounds such as trimethylolpropane, glycerine; and other polyfunctional compounds such as pentaerythritol, sorbitol, ammonia, ethylene diamine, 1,3-diaminopropane, 1,6-hexanediamine, isomers of phenylenediamine and toluenediamine, 4,4′-diphenylmethane diamine and its isomers, diethanolamine, ethanolamine, dimethylethanolamine N-methylethanolamine, triethanoamine, triisopropanolamine, ethylmercaptan, thiophenol and propylene disulfide.

Additional examples of compounds suitable for initiating polymerization of alkylene oxides are the various oligomeric polyols known in the art. These include the poly (1,4-butylene oxide)polyethers and the hydroxyl and amine terminated poly-(butadienes). When polyols (or other oligomers) are used for initiating polymerization of the alkylene oxides, their molecular weights can range from 400 to about 3000. When the conventional initiators such as described above (i.e., glycerine, water, etc.) are used, their molecular weight can range from about 18 (for water) up to about 400. Preferably R contains from two to six carbon atoms and most preferably three to six carbon atoms.

The alkylene oxides and monomers that find utility in the present invention are those well known in the art. These include propylene oxide, ethylene oxide, the alpha olefin oxides such as 1,2-epoxybutane and 1,2-epoxyoctadecane, oxetane, and tetrahydrofuran.

"H" denotes the group represented by the formula:

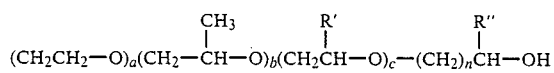

"P" denotes the group represented by the formula:

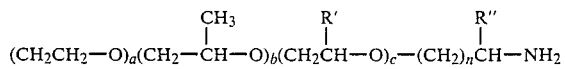

"S" denotes the group represented by the formula:

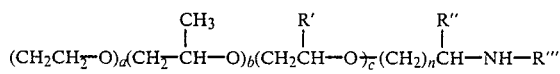

"T" denotes the group represented by the formula:

wherein:

the letter "a" defines the ethylene oxide content of the N-(polyoxyalkyl)-N-(alkyl)amine and can range from a value of zero to 175. The preferred range for "a" is 0 to 90. When b or c is not equal to zero, the most preferred range for "a" is 0 to 50.

The letter "b" defines the propylene oxide content of the N-(polyoxyalkyl)-N-(alkyl)amine and can also range from a value of zero to 175. Preferably, "b" should range from 20 to 115 and most preferably from 25 to 98.

The letter "c" defines the alpha olefin oxide

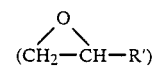

content of the N-(polyoxyalkyl)-N-(alkyl)amine and can range from 0 to 30. Preferably, "c" can range from zero to 15 and most preferably, from 0 to 2.

The letter "n" equals from 1 to 3, most preferably 1.

Two aspects of a, b and c are important and must be noted. The first is that the sum of a+b+c must always be greater than or equal to 2 when n equals 1. Second, a, b and c indicate ethylene oxide, propylene oxide and alpha olefin oxide which can be incorporated into the product backbone in any sequence, i.e., blocks or random sequence, in any configuration.

R′ is an alkyl group containing from two carbon atoms to eighteen carbon atoms depending on the alpha olefin oxide used in preparation of the amine. While R′ can contain up to eighteen carbon atoms, two carbon atoms are most preferred.

R″ is hydrogen or an alkyl group containing up to eighteen carbon atoms. It is preferred that R″ is hydrogen or alkyl group containing up to two carbons, and most preferably a methyl group.

R‴ and R⁗ are independently an alkyl group containing from two to twelve carbon atoms, preferably containing from two to six carbon atoms, and most preferably an isopropyl group.

The letter "h" indicates the relative hydroxyl content remaining after amination and has been found to range from 0 to 0.7 with 0 to 0.3 preferred and 0 to 0.15 most preferred. As noted, "h" is related to the percent amination, i.e. 30 percent amination would result in a hydroxyl content of 70 percent and thus "h" would equal 0.7. Values are obtained by taking the total amine number as measured in milliequivalents per gram and dividing by the initial hydroxyl number (meq/g) and subtracting that quotient from 1.0.

The letter "p" indicates the relative primary amine content to total amine content formed during amination and is from 0 to 0.7, preferably 0 to 0.4.

The letter "s" indicates the relative secondary amine content to total amine content formed during amination and is from 0.3 to 1.0, preferably from 0.50 to 1.0, most preferably 0.70 to 1.0.

The letter "t" indicates the relative tertiary amine content to total amine content formed during amination and is from 0 to 0.15, preferably from 0 to 0.05. The sum of p, s and t must equal 1.0.

The letter "z" is an integer derived from the number of Zerewitinoff active hydrogens on the initiator. The letter "z" is preferably 2 to 6, and most preferably 3 to 6.

The N-(polyoxyalkyl)-N-(alkyl)amines of the present invention are prepared by direct, catalytic amination of an appropriate polyol with an amine:

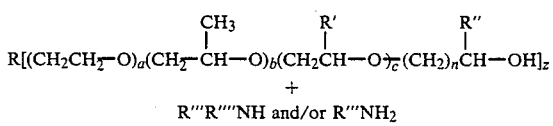

$$R[(CH_2CH_2-O)_a(CH_2-CH(CH_3)-O)_b(CH_2CH(R')-O)_c(CH_2)_nCH(R'')-OH]_z$$
$$+$$
$$R'''R''''NH \text{ and/or } R'''NH_2$$

Representative amines that can be used in the amination are various primary amines and secondary amines. Representative primary amine examples include but are not limited to: ethylamine, n propylamine, isopropylamine, cyclohexylamine, laurylamine, t-butylamine and s-butylamine. Representative secondary amine examples include but are not limited to: diethylamine, di-n-propylamine, diisopropylamine, di-n-butylamine, diisobutylamine, di-2-ethylhexylamine, di-sec-butylamine, dioctylamine, n-ethyl-n-butylamine and diphenylamine. Use of these secondary amines tends to produce N-(polyoxyalkyl)-N-(alkyl)amines with higher than expected secondary amine content and surprisingly low tertiary amine content as described in copending patent application D-15856 filed concurrently. It is also anticipated that blends of primary and secondary amines can be used in the amination process.

Another method for preparing secondary amine containing polyether is described in U.S. Pat. No. 4,286,074, where a primary amine terminated polyether is allowed to react with acetone, with the resulting ketimine being hydrogenated to the product. Although this method is only exemplified for about 1000 equivalent weight materials, it is technically applicable to other molecular weights and functionalities. However, this approach is somewhat limited by the availability of the parent primary amine terminated polyether.

It should be noted that although the reaction of a primary amine with an alcohol (polyol) is a known approach, nonetheless U.S. Pat. No. 4,686,242 teaches that this approach actually produces an amine terminated polyether where the amine groups are predominantly primary in character.

The alcohols, and especially the monols and polyols used in the present invention, are well known in the art and commercially available from a variety of sources.

The reaction is carried out in a batch autoclave at elevated temperature, generally between 175° C. to 250° C. and preferably 190° C. to 240° C. The reaction pressure will range from 250 to 2000 psi, preferably 500 to 1250 psi. The reaction is run in the presence of hydrogen. Under these conditions the hydroxyl-containing polymer remains in the liquid phase. The stoichiometry on a amine to hydroxyl equivalent basis will range from 2:1 to 20:1, preferably 5:1 to 10:1. The reaction will generally occur in 4 to 24 hours. The catalyst is a nickel, copper or cobalt based catalyst, either unsupported or on an inert support. Most preferably the catalyst is nickel. When the catalyst is supported, the metal content of the catalyst should be about 25% or more, preferably 50% or more. The catalyst loading is generally on the order of 1 to 5 weight percent based on total charge.

In addition to the batch process described above, the amination can be carried out using a liquid phase continuous amination process. In this process, a pelletized or extruded form of the nickel, copper or cobalt catalyst optionally on a support, is charged to a high pressure tubular reactor. Most preferably the catalyst is nickel. The reactor is heated to 175° C. to 250° C., preferably 190° C. to 240° C. and a mixture of amine polyol (2:1 to 20:1, preferably 5:1 to 10:1 on an equivalents basis) is pumped through the reactor at a flow rate ranging from about 0.5 to 5.0 g feed/g catalyst/hr. Hydrogen is added to the feed stream at a minimum rate of 1 standard cc/min. Reactor pressure is controlled by a back pressure regulator to 250 to 2000 psi, preferably 500 to 1200 psi. The products isolated from the continuous process are similar to those isolated from the batch process.

The N-(polyoxyalkyl)-N-(alkyl)amines of the present invention find utility in the preparation of polyureas and polyurethane-urea products.

The present invention provides a method for producing polyurea foams which include reacting: (a) a N-(polyoxylalkyl)-N-(alkyl)amine of this invention alone or in some instances in combination with other polymers with Zerewitinoff active hydrogen atoms, and (b) an organic polyisocyanate and optionally in the presence of (c) additives to produce the polyurea or polyurethane-urea product. When a foam is being prepared, these additives generally include catalyst, blowing agent, crosslinkers and foam stabilizers. The reaction and foaming operations can be performed in any suitable manner, preferably by the one-shot technique.

Although the N (polyoxyalkyl)-N-(alkyl)amines of this invention may be used as the sole reactant with the other ingredients, they may also be used in blends with other polyether intermediates known in the art. Thus, the N-(polyoxyalkyl)-N-(alkyl)amines of the invention can be blended with conventional polyether polyols (such as described in U.S. Pat. No. 3,346,557), polymer polyols (such as described in U.S. Pat. Nos. Re. 28,715 and Re. No. 29,118, 3,652,639, 3,823,201, 3,850,861, 4,454,255, 4,458,038, 4,550,194, 4,390,645 and 4,431,754), and with polymer dispersions in amine terminated polyethers as described in U.S. Pat. No. 4,286,074. Limitations on the relative amounts of N-(polyoxyalkyl)-(N)-(alkyl)amines and other materials used in the blends are discussed in the examples.

The organic polyisocyanates that are useful in producing polyurea or polyurethane-urea foams in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene (TDI), methylene bis(4-cyclohexyl isocyanate), isophorone diisocyanate, 1,2- diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diioocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4′ and 4,4′-diphenyl methane diisocyanate (MDI), and derivatives thereof 3,3-diphenyl-methylene-diisocyanate, and polymethylene poly (phenyleneisocyanates) as described in the literature and in many patents, for example, U.S. Pat. Nos. 2,683,730; 2,950,263; 3,012,008; 3,344,162; and 3,362,979, and mixtures thereof.

Additional aromatic polyisocyanates include p-phenylene diisocyanate, polymethylene polyphenylisocyanate, dianisidine diisocyanate, bitolylene diisocyanate, naphthalene-1,4-diisocyaate, bis(3-methyl-3-isocyanatophenyl)methane, bis(3-methyl-4-isocyanatophenyl)methane, and 4,4′-diphenylpropane diisocyanate.

The preferred polyisocyanate is TDI or about 80% of a mixture of 80% 2,4-tolylene diisocyanate and 20%, 2,6-tolylene diisocyanate and about 20% of a polymeric MDI.

Any known catalysts useful in producing polyurethane foams may be employed. Representative catalysts include: (a) tertiary amines such as bis(2,2′-dimethylamino)ethyl ether, trimethylamine, triethylamine, N-methylmorpholine, N-ethylmorpholine, N,N-dimethylbenzylamine, N,N-dimethylethanolamine, N,N,N′,N′-tetramethyl-1,3-butanediamine, triethanolamine, 1,4-diazabicyclo-[2.2.2]octane, hexamethylenetetramine, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone 2-carboxylate, acetylacetoneimine, bis-acetylacetone-alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

Representative crosslinker examples include but are not limited to: glycol amines; diethanolamine, triethanolamine, monoethanolamine, methyldiethanolamine, isopropanolamine, 2-hydroxyethylpiperazine, aminoethylethanolamine, 2-aminoethanol, Quadrol®, amines; aminoethylpiperazine, p-phenylenediamine, m-phenylenediamine, diisopropanolamine, glycols; sorbitol, ethylene glycol, glycerine.

When the polyurea or polyurethane-urea foam is formed, a small amount of a blowing agent is employed in the reaction mixture. Suitable blowing agents, for example, include generally, water from about 0.1 to about 10 weight percent, based upon total weight of N-(polyoxyalkyl)-N-(alkyl)amine and polyol or other suitable blowing agents which are vaporized by the exotherm of the reaction, or a combination of water and the other blowing agent. Illustrative polyurea and polyurethane blowing agents include halogenated hydrocarbons such as trichloromonofluoromethane, dichlorodifluoromethane, dichloromonofluoromethane, dichloromethane, trichloromethane, 1,1-dichloro 1-fluoroethane, 1,1,2-trichloro 1,2,2-trifluoroethane, hexafluorocyclobutane, octafluorocyclobutane, and the like. Another class of blowing agents include thermally unstable compounds which liberate gases upon heating such as N,N′-dimethyl-N,N′-dinitrosoterephthalamide, amine formates, formic acid, and the like. The generally preferred method of foaming for producing foams is the use of water, or a combination of water plus a fluorocarbon blowing agent such as trichloromonofluoromethane. The quantity of blowing agent employed will vary with factors such as the density desired in the foamed product.

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,629,308. The latter class of copolymers differs from the above-mentioned polysiloxane-polyoxylakylene block copolymers in that the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

Whereas the exact scope of the instant invention is set forth in the appended claims, the following specific examples illustrate certain aspects of the present inventions and, more particularly, point out methods of evaluating the same. However, the examples are set forth for illustration only and not to be construed as limitations on the present invention except as set forth in the appended claims. All parts and percentages are by weight unless otherwise specified.

EXAMPLES

Definitions

Polyol #1==A polyoxyalkylene oxide triol produced from propylene oxide and glycerine. The product has an hydroxyl number of 34.

Polyol #2=A polyoxyalkylene oxide triol produced from propylene oxide and glycerine. The product has an hydroxyl number of 28 and the polymerization was carried out at 105° C.

Polyol #3=A polyoxyalkylene oxide diol produced from propylene oxide and propylene glycol. The product has an hydroxyl number of 56.

Polyol #4=A polyoxyalkylene oxide triol produced from propylene oxide and ethylene oxide having an hydroxyl number of 56. The ethylene oxide is present as an internal block at a level of 8.0%.

Polyol #5=A polyoxyalkylene oxide triol produced from propylene oxide and glycerine having an hydroxyl number of 240.

Polyol #6=A polyoxyalkylene oxide triol produced according to Example 1.

Polyol #7=A polyoxyalkylene oxide triol produced according to Example 2.

Polyol #8=A polyoxyalkylene oxide triol produced according to Example 3.

Polyol #9=A polyoxyalkylene oxide diol produced according to Example 4.

Polyol #10=The same as Polyol #2 with the exception that the polyol backbone contains 17% internal ethylene oxide.

Polyol #11=A polyoxyalkylene oxide triol produced from propylene oxide and ethylene oxide having an hydroxyl number of 35.5. The ethylene oxide content is 16.5%, present as a cap.

Polyol #12=A polyoxyalkylene oxide diol prepared from diethylene glycol and ethylene oxide having a hydroxyl number of 11.1.

Polyol #13=A polyoxyalkylene oxide diol prepared from a 2000 molecular weight poly(1,4-butylene)oxide initiator and propylene oxide having a hydroxyl number of 49.6 and containing 10% propylene oxide.

Polyol #14=A polyoxyalkylene oxide triol prepared from glycerine, propylene oxide, ethylene oxide and 1,2 epoxyoctadecane in which the propylene oxide (69.2%) and ethylene oxide (16.2%) are present as internal blocks and the 1,2 epoxyoctadecane (14.5%) is present as a cap. The polyol has a hydroxyl number of 52.

Polyol #15=A polyoxyalkylene oxide triol prepared from glycerine, propylene oxide and ethylene oxide having an hydroxyl number of 29 mgKOH/g. the ethylene oxide content 16.5%, present as a cap.

Polyol #16=A polyoxyalkylene oxide triol prepared from glycerine and propylene oxide. The final product has an hydroxyl number of 650 mg KOH/g.

Monol #1=A polyether fluid sold commercially by Union Carbide as UCON ™ Fluid 50-HB -2000.

Monol #2=A polyether surfactant sold commercially by Union Carbide as Tergitol ™ 24-L-50.

Polymer Polyol #1=Polyol #15 containing a 28% dispersion of a 30/70 acrylonitrile/styrene polymer.

T 5000=A polyoxyalkylene oxide triamine with an amine equivalent weight of 1666 in which all of the amine groups are primary amines. T-5000 is a commercial product of Texaco Chemical Company sold under the name Jeffamine ™ T-5000.

Catalyst #1=A nickel catalyst sold commercially by Harshaw/Filtrol Partnership as "Nickel 5136P".

Catalyst #2=Raney nickel sold commercially by Activated Metals.

Catalyst #3=70% bis(dimethylamine ethyl) ether in dipropylene glycol

Catalyst #4=33% triethylene diamine in dipropylene glycol

Catalyst #5=a tin catalyst sold by M&T Chemical as T-120.

Catalyst #6=an amine catalyst sold as C-220 by Union Carbide Corporation

Catalyst #7=an amine catalyst sold by Air Products as D-8154

Isocyanate A=toluene diisocyanate (80% 2,4; 20% 2,6)

Surfactant A=Polysiloxane polyether block copolymer sold by Union Carbide as L-5340

Surfactant B=Polysiloxane polyether block copolymer sold by Union Carbide as L-5421

Surfactant C=Polysiloxane polyether block copolymer sold by Union Carbide as Y-10,184

Surfactant D=Polysiloxane polyether block copolymer sold by Union Carbide as Y-10,197

Foam Modifier A=a foam modifier prepared according to example 7 of EPC application publication No. 220697 published May 6, 1984 (also U.S. Ser. No. 791,515 filed Oct. 25, 1985.

EXAMPLE 1

Preparation of Polyol #6. A five gallon autoclave was charged with 1600 g of Polyol #5 dehydrated to 0.011% water, 1600 g of heptane and 10 g of zinc hexacyanocobaltate. The reactor was purged with nitrogen and evacuated to 2 psia at room temperature. The catalyst was activated for 2 hr. at 80° C. and 380 g (20 psia partial pressure) of propylene oxide fed. Almost no induction period was observed and pressure dropped as soon as cookout began. Propoxylation was continued at 80° C. The reaction was fast and addition rate was controlled by the ability of the system to remove heat. A total of 17.7 kg of propylene oxide was fed.

The polyol was stripped to remove all volatiles, and analyzed. The polyol had an hydroxyl number of 21.0 mg KOH/g, an unsaturation of 0.009 meq/g, a water content of 0.014% and a viscosity of 2566 cks.

EXAMPLES 2 AND 3

The procedure outlined in Example 1 was used except that the autoclave was charged with 1250 g Polyol #5, 1150 g heptane and 7.5 g of zinc catalyst. A total of 20 kg of propylene oxide was fed at a rate of 1800 g/hr. One half of this mixture was removed from the reactor and refined to give Polyol #7, with an hydroxyl number of 16.2 mg KOH/g. Additional propylene oxide (5800 g) was then fed to the reaction mixture and allowed to react as before. This material was then refined to give Polyol #8, with an hydroxyl number of 11.3 mg KOH/g.

EXAMPLE 4

Preparation of Polyol #9. The procedure used was that of Example 1 except that a 425 MW propylene oxide diol, 1250 g, heptane, 1259 g, and zinc catalyst 7.5 g were charged to the reactor. A total of 21,242 g of propylene oxide was then fed as before. A a diol with an hydroxyl number of 11.9 mg KOH/g was obtained.

EXAMPLE 5

Preparation of 5000 MW N-(polyoxyalkyl-N-(alkyl)amine. Polyol #1 (999.1 g, 0.605 g), isopropylamine (318.9 g, 5.39 m) and 25 g (2.5% on polyol) of Catalyst #1 were charged to a two liter autoclave. The system was pressurized and vented five times with hydrogen, and then pressurized to 500 psi and sealed. The reactor was heated to 240° C. for 12 hr. After cooling, the contents were discharged and the catalyst filtered. The product was vacuum stripped to remove excess amine (2 mm, 90° C., 3 hr.). The isolated material had an amine number of 0.515 meq/g, a conversion of 93%, and contained 5.0% of a coupled product. Secondary amine content of this particular product was not measured. Subsequent analysis of a subsequent material made under identical conditions indicated that the primary amine content was 50%, based on the percentage of total reactive amine, the secondary amine 50% and the tertiary level was 0.037 meq/g.

EXAMPLES 6 THROUGH 13

Following the procedure set forth in Example 5, N-(polyoxyalkyl-N-(alkyl)amines were prepared as shown in Table A.

EXAMPLES 14–20

The general procedure used was that of Example 5. In some cases, autoclaves of different sizes were utilized, but the reaction conditions were the same. In each of the following experiments, Polyol #2 was allowed to react with a 10 fold excess of the indicated secondary amine for about 19 hr. under the following conditions: Catalyst charge 3.5% on polyol, initial hydrogen pressure 200 psi, reaction temperature 190° C. The results are shown below:

EXAMPLE 14 THROUGH 20

Examples of N-(polyoxyalkyl)-N-(alkyl)amines containing higher levels of secondary amine.

| Ex | Amine | Amine #* | Conv, % | Sec. % | Pri. % | Tert* |
|---|---|---|---|---|---|---|
| 14 | Diethyl | 0.418 | 85.3 | 65.3 | 33.7 | 0.0044 |
| 15 | Di-n-propyl | 0.376 | 76.7 | 74.3 | 25.7 | 0.019 |

-continued

| Ex | Amine | Amine #* | Conv, % | Sec. % | Pri. % | Tert* |
|---|---|---|---|---|---|---|
| 16 | Diisobutyl | 0.386 | 78.7 | 96.0 | 4.0 | 0.065 |
| 17 | Di-n-butyl | 0.450 | 91.8 | 84.6 | 15.5 | 0.046 |
| 18 | Diisopropyl | 0.474 | 96.7 | 73.0 | 27.0 | 0.0074 |
| 19 | Diphenyl | 0.464 | 95.0 | 93.6 | 6.4 | 0.014 |
| 20 | Dicyclohexyl | 0.412 | 87.6 | 100.0 | 0.0 | 0.003 |

*in meq/g.

EXAMPLE 21

Preparation of N-(polyoxyalkyl)-N-(alkyl)amine from polyol #2 using a mixed diamine feed. The procedure used was that of Example 5. Polyol #12, 800 g, diisopropylamine, 308 g, isopropylamine, 44 g, Catalyst #1, 28 g and hydrogen, 200 psi were added to a 2 liter autoclave. The mixture was heated to 190° C. for 20.5 hr. The catalyst was removed by filtration and the excess amine by vacuum stripping. The isolated product had the following analysis: Total amine #0.457 meq/g, conversion 97.2%, secondary amine 90%, primary amine 10% and tertiary amine 0.017 meq/g.

EXAMPLE 22

The procedure described in Example 5 was used except Monol #1 (1031 g, 0.33m.), isopropylamine (345, 5.8 m) Catalyst #1 (25 g) and hydrogen, 975 psi were heated to 250° C. for 6 hr. The product was colorless and had a conversion of 50%.

EXAMPLE 23

The procedure described in Example 5 was used except Monol #2 (1010 g), isopropylamine (625 g), Catalyst #1, 25 g and hydrogen, 500 psi were charged to the reactor and heated to 235° C. for 15 hr. The product had a conversion of 77%.

Use of N-(polyoxyalkyl)-N-(alkyl)amines in foams.

A standard foam formulation was used in the evaluation of all amines in this study unless otherwise noted. The formulation was:

| Polyether or Amine | 100 php |
|---|---|
| Water | 4.0 |
| Catalyst #3 | 0.1 |
| Catalyst #4 | 0.4 |
| Surfactant A | 2.0 |
| Surfactant B | 2.0 |
| Foam Modifier A | 2.0 |
| Isocyanate A | 105 Index |

The foams were made by mixing the ingredients in a container on a drill press equipped with a turbine blade stirrer. The stirring speed was 4000 rpm. The polyether, water, catalysts, surfactants and other additives except the isocyanate were all added to the mixing container and stirred for 60 sec. The mixture was allowed to stand 15 sec. Stirring was started again, the isocyanate added, and stirred an additional 6 sec. This mixture was then rapidly poured into a 9×9×4 inch box and allowed to foam. Each foam was subsequently cured for 5 min. at 120° C.

EXAMPLE 24

Control foam from Polyol #11. This foam was run as a base line for comparison with those made using the amine terminated polyethers. This foam was made from the same ingredients with the exception that Surfactant A and Surfactant B were replaced with Surfactant C. It processed easily as expected. No problems were encountered in mixing the ingredients or in pouring the mixed components into the foam container. The foam expanded to fill the container and showed a tendency to shrink when cooling after curing.

EXAMPLE 25

Comparative Example using the primary amine terminated polyether T-5000. When T-5000 was used in the above formulation, it was not possible to make a foam. Gel formation, as evidenced by significant polymer build up on the stirrer shaft, started essentially as soon as the isocyanate was added to the reaction mixture. In fact, the reaction was so fast that no material could be poured from the mixing container after the mixing step.

EXAMPLE 26

Polyurea foam made using N-(polyoxyalkyl)-N-(alkyl)amine prepared in Example 5. When the amine from Example 5 was used in the above foam formulation, no significant handling problems were encountered. Mixing was easily accomplished, and the mixture was readily poured into the foam container. The overall reaction rate appeared to be slightly faster than observed with Polyol #11, but certainly not approaching that of T-5000. The resultant foam completely filled the container, and there was no tendency for it to shrink after curing for 5 min. at 120° C.

Examples 27 through 35 are set forth in Table B and show the utility of various N-(polyoxyalkyl)-N-(alkyl)amines in the preparation of polyurea foams.

EXAMPLE 36

Preparation of 10,000 MW N-(polyoxyalkyl)-N-(alkyl)amine (100% ethylene oxide, difunctional). The procedure used was that of Example 5. Polyol #12, 750 g, isopropyl amine, 167.0 g, catalyst #1, 26.3 g and hydrogen (200 psi) were heated to 220° C. for 4 hr. The solid product was freed of catalyst by dissolving in methanol and filtering the methanol solution. The methanol and excess amine were removed by vacuum stripping to yield a waxy solid with an amine number of 0.185 meq/g and a conversion of 94%.

EXAMPLE 37

Preparation of 2400 MW N-(polyoxyalkyl)-N-(alkyl)amine (poly(1,4-butylene)oxide initiated, difunctional). The procedure used was that of Example 5. Polyol #13, 675 g. isopropylamine, 352.8 g, catalyst #1, 23.6, and hydrogen (200 psi) were heated to 220° C. for 4 hr. The product mixture filtered to remove the catalyst and the excess amine removed by vacuum stripping. The isolated waxy solid had an amine number of 0.85 meq/gram and a conversion of 100%.

EXAMPLE 38

Preparation of 5700 MW N-(polyoxyalkyl)-N-(alkyl)amine (1,2 epoxyoctadecane capped, trifunctional). The procedure used was that of Example 5. Polyol #14, 400 grams, isopropylamine, 125.9 grams, catalyst #1, 14.0 grams, and hydrogen (200 psi) were heated to 220° C. for 4 hr. The product mixture was filtered to remove the catalyst and the excess amine removed by vacuum stripping. The isolated product had an amine number of 0.73 meq/gram and a conversion of 77.6%.

Examples 39–45 are set forth in Table C, and show the utility of high secondary amine content N-(polyoxyalkyl)-N-(alkyl)amine in certain foams. Blends of this class of amine with polyol and polymer polyol are demonstrated as are blends with the high primary amine product T-5000. The maximum primary amine content in such a blend is defined.

Examples 46–50 are set forth in Table D. This data show the range of primary amine content polyether that can be tolerated in a foam formulation when the primary amine containing polyether (T-5000) is blended with polyol, polymer polyol or a polymer dispersion in T-5000. The maximum primary amine content is about 80%.

TABLE A

| Ex. # | Polyol* | MN | Funct. | Catalyst #/% | Temp., °C. | Time, hr. | H$_2$ psi | Amine # Meq/g | Conv., % | 2 | 1° | 3 meq/g | Coupling % |
|---|---|---|---|---|---|---|---|---|---|---|---|---|---|
| 6 | 2 | 6,000 | 3 | 3.5 | 220 | 8 | 200 | 0.438 | 91.2 | — | — | — | 7.5 |
| 7 | 3 | 2,000 | 2 | 3.5 | 220 | 8 | 200 | 0.941 | 94.3 | | | | 7.2 |
| 8 | 4 | 3,000 | 3 | 3.5 | 220 | 8 | 200 | 0.990 | 100.00 | | | | 4.8 |
| 9 | 6 | 8,000 | 3 | 2.5 | 239 | 9 | 300 | 0.336 | 90.8 | 22.4 | 77.6 | 0.0075 | 0.0 |
| 10 | 7 | 10,000 | 3 | 2.0 | 236 | 8 | 500 | 0.239 | 83.5 | 43.2 | 56.8 | 0.0005 | 0.0 |
| 11 | 8 | 15,000 | 3 | 2.0 | 240 | 8 | 500 | 0.135 | 76.0 | | | | — |
| 12 | 9 | 10,000 | 2 | 3.5 | 220 | 6 | 200 | 0.183 | 87.1 | 59.0 | 41.0 | | — |
| 13 | 10 | 6,000 | 3 | 2.5 | 249 | 7 | 599 | 0.470 | 97.0 | 45.0 | 55.0 | 0.0026 | 3.6 |

*Polyol used to prepare the N—(polyoxyalkyl)-N—(alkyl)amine

TABLE B

Foams Made Using N—(Polyoxyalkyl)-N—(Alkyl)Amines

| Example # | N—(Polyoxyalkyl)-N—(Alkyl)Amines From: | | | | | | | | |
|---|---|---|---|---|---|---|---|---|---|
| Example 27 | Ex. 6 | — | — | — | — | — | — | — | — |
| Example 28 | — | Ex. 7 | — | — | — | — | — | — | — |
| Example 29 | — | — | Ex. 8 | — | — | — | — | — | — |
| Example 30 | — | — | — | Ex. 9 | — | — | — | — | — |
| Example 31 | — | — | — | — | Ex. 10 | — | — | — | — |
| Example 32 | — | — | — | — | — | Ex. 11 | — | — | — |
| Example 33 | — | — | — | — | — | — | Ex. 12 | — | — |
| Example 34 | — | — | — | — | — | — | — | Ex. 13 | — |
| Example 35 | — | — | — | — | — | — | — | — | Ex. 18 |
| Water | 4.0 | | | | | | | | |
| Catalyst 3 | 0.1 | | | | | | | | |
| Catalyst 4 | 0.4 | | | | | | | | |

TABLE B-continued

| | | Foams Made Using N—(Polyoxalkyl)-N—(Alkyl)Amines | | | | | | | |
|---|---|---|---|---|---|---|---|---|---|
| Example # | | N—(Polyoxyalkyl)-N—(Alkyl)Amines From: | | | | | | | |
| Surfactant A | 2.0 | | | | | | | | |
| Surfactant B | 2.0 | | | | | | | | |
| Foam Modifier A | 2.0 | | | | | | | | |
| TDI | 105I | | | | | | | | |
| Comments: | OK | Fast but Made Foam | Fast but Made Foam* | OK | OK | OK | OK | OK | OK |

*This foam was somewhat faster than the one made in Example 18. The judgment was that this was about as fast as could still be handled in making a foam. However, even this system was not as fast as one employing T-5000.
**Several foams were made without Foam Modifier A. The difference observed was slightly better foam quality when it was present.

TABLE C

| | Foam Examples Showing Utility of High Secondary Amine Containing N—(Polyoxyalkyl)-N—(Alkyl)amine* | | | | | | |
|---|---|---|---|---|---|---|---|
| Reactants | Ex. #39 | #40 | #41 | #42 | #43 | #44 | #45 |
| Amine from Ex 18 (73% Sec) | 100 | 50 | 50 | 50 | 59 | 66 | 75 |
| Polyol #15 | — | 50 | — | — | — | — | — |
| Polymer Polyol #1 | — | — | 50 | — | — | — | — |
| T-5000 (100% Primary Amine) | — | — | — | 50 | 41 | 33 | 25 |
| Water | 4.0 | | | | | | |
| Catalyst 3 | 0.1 | | | | | | |
| Catalyst 4 | 0.4 | | | | | | |
| Catalyst 5 | 0.1 | | | | | | |
| Surfactant A | 2.0 | | | | | | |
| Surfactant B | 2.0 | | | | | | |
| Foam Modifier A | 2.0 | | | | | | |
| TDI, Index | 105 | | | | | | |
| Comments: | OK Good Foam Shrinks | OK Good Foam Shrinks | OK Good Foam Shrinks | Too Fast — | OK Good Foam No Shrink | OK Good Foam No Shrink | OK Good Foam Shrinks |

*Note that More than 50% of the 100% primary amine containing materials is too fast to control under these conditions.

TABLE D

| Examples 46-50 - Determination of Primary Amine Tolerance in a Foam Formulation. Decreasing Amine content to improve formability. | | | | | |
|---|---|---|---|---|---|
| Reactants | Ex. 46 | 47 | 48 | 49 | 50 |
| Polyol #15 | — | 20 | 40 | 30 | 60 |
| T-5000 | 60 | 40 | 20 | 30 | — |
| Polymer In T-5000* | 40 | 40 | 40 | 20 | — |
| Polymer Polyol #1 | — | — | — | 20 | 40 |
| Water | 3.8 | 3.8 | 3.8 | 3.8 | 3.8 |
| HN(C$_2$H$_4$OH)$_2$ | 1.7 | 1.7 | 1.7 | 2.0 | 1.7 |
| Catalyst 6 | 0.05 | 0.05 | 0.05 | 0.12 | 0.18 |
| Catalyst 4 | 0.05 | 0.05 | 0.05 | 0.12 | 0.18 |
| Catalyst 7 | 0.18 | 0.18 | 0.18 | — | — |
| Catalyst 5 | 0.03 | 0.03 | 0.03 | 0.005 | 0.005 |
| Surfactant D | 1.5 | 1.5 | 2.0 | 1.8 | 1.8 |
| TDI, Index | 100 | 100 | 100 | 100 | 100 |
| Mold Temp. °F. | 140 | 140 | 140 | 140 | 140 |
| Cream Time, Sec. | 1.0 | 4.0 | 5.0 | 6 | 5 |
| Exit Time, Sec | — | 35 | 44 | 52 | 45 |
| Comment | Too Fast 100% Amine (1°) | Fair Foam 80% Amine (1°) | Good Foam 60% Amine (1°) | Good Foam 50% Amine (1°) | Good Foam 0% Amine |

*Polymer dispersion in T-5000 as defined in U.S. Pat. No. 4,286,074

EXAMPLE 51

Preparation of a low molecular (ca. 400) N-(polyoxyalkyl)-N-(alkyl)amine for use as a foam modifier. Polyol #16 (388 g), isopropyl amine (1329 g) and Catalyst #1 (1358 g) were charged to a one gallon autoclave. The system was pressurized and vented several times with hydrogen and then pressurized to 200 psi with hydrogen. The reactor was heated to 220° C. and held for 6 hrs. After cooling, the contents were discharge, the catalyst filtered and the excess amine removed by vacuum stripping. The isolated material had the following analysis: Total amine #7.114 meq/g, conversion 90.97% and tertiary amine 0.27 meq/g.

EXAMPLE 52

Use of a low molecular weight N-(polyoxyalkyl)-N-(alkyl)amine in a urethane foam. The product from Example #51 was added to a conventional foam formulation at low level. The unexpected result was an improvement of the "SAG" response of the foam. "SAG" response is the ratio of the IFD load of the foam at 65% deflection to the IFD load of the foam at 25% deflection. The results are shown below:

| Formulation | Control Foam | Foam Containing Ex. 51 |
|---|---|---|
| E-667* | 100 | 97 |
| Example #51 | — | 3 |
| Water | 1.9 | 1.9 |
| Diethanolamine | 0.8 | 0.8 |
| Amine Catalyst** | 0.2 | 0.2 |
| Dibutyltin dilaurate | 0.12 | 0.12 |
| L-5309+ | 1.0 | — |
| DE-60F Special*** | 4.0 | 4.0 |
| Y-10,459 | — | 1.3 |
| TDI (Index) | 105 | 105 |

-continued

| Formulation | Control Foam | Foam Containing Ex. 51 |
|---|---|---|
| Properties | | |
| Density, pcf | 3.1 | 3.06 |
| 25% IFD | 32.4 | 22.1 |
| 65% IFD | 73.1 | 66.5 |
| "SAG" | 2.25 | 3.01 |
| Tensile, psi | 18 | 15 |
| Elongation, % | 143 | 137 |

*A polyol sold commercially by Union Carbide
**A 25:75 wt/wt Blend of Bis(dimethylaminoethyl) ether and triethylene diamine catalyst.
The bis-(dimethylaminoethyl)ether catalyst is A-1, sold commercially by Union Carbide, and the triethylene diamine solution is sold commerically by Air Products as D-33LV.
+ A silicone surfactant sold commercially by Union Carbide
****A flame retardant additive sold commercially by Great Lakes Chemical.

We claim:

1. A prcess for the preparation of polyurea foams which process comprises:
(a) forming a reaction mixture of an amine mixture and an organic isocyanate,
(b) reacting the amine mixture with the organic isocyanate in the presence of a catalyst, water and a foam stabilizer, and
(c) allowing the reaction mixture to rise and cure to form a polyurea foam wherein the amine mixture is of the general formula:

$$R \underset{\left[\begin{array}{c}(P)_p \\ (S)_s \\ (T)_t\end{array}\right]_{z-(hz)}}{\overset{[H]_{(hz)}}{\diagup}}$$

wherein:
R represents an initiator radical based on a compound containing Zerewitinoff active hydrogen atoms;
H represents a hydroxy-containing group of the formula:

$$(CH_2CH_2-O)_a(CH_2-\overset{CH_3}{\underset{|}{CH}}-O)_b(CH_2\overset{R'}{\underset{|}{CH}}-O)_c-(CH_2)_n\overset{R''}{\underset{|}{CH}}-OH;$$

P represents a primary amine-containing group of the formula:

$$(CH_2CH_2-O)_a(CH_2-\overset{CH_3}{\underset{|}{CH}}-O)_b(CH_2\overset{R'}{\underset{|}{CH}}-O)_c-(CH_2)_n\overset{R''}{\underset{|}{CH}}-NH_2;$$

S represents a secondary amine-containing group of the formula:

$$(CH_2CH_2-O)_a(CH_2-\overset{CH_3}{\underset{|}{CH}}-O)_b(CH_2\overset{R'}{\underset{|}{CH}}-O)_c-$$
$$-(CH_2)_n\overset{R''}{\underset{|}{CH}}-NH-R''';$$

T represents a tertiary amine-containing group of the formula:

$$(CH_2CH_2-O)_a(CH_2-\overset{CH_3}{\underset{|}{CH}}-O)_b(CH_2\overset{R'}{\underset{|}{CH}}-O)_c-$$
$$-(CH_2)_n\overset{R''}{\underset{|}{CH}}-NR'''R'''';$$

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.7;
p is from 0 to 0.7;
s is from 0.3 to 1.0;
t is from 0 to 0.15;
(hz) is the product of h and z;
p+s+t=1; and
z is 2 to 6.

2. The process of claim 1 wherein:
R contains from two to six carbon atoms,
a is 0 to 150,
b is 20 to 115,
c is 0 to 15,
R' is an alkyl group containing two carbon atoms, and
R''' contains from two to six carbon atoms.

3. The process of claim 1 wherein:
R contains from three to six carbon atoms,
a is 0 to 90,
b is 25 to 98,
c is 0 to 2,
R''' is an isopropyl group, and
z is 3 to 6.

4. The process of claim 1 wherein R has a molecular weight of 18 to 400.

5. The process of claim 1 wherein R contains from three to six carbon atoms.

6. The process of claim 5 wherein R is $$\begin{array}{ccc}CH_2-CH-CH_2.\\ | & | & | \\ O & O & O \\ | & | & |\end{array}$$

7. The process of claim 5 wherein the amine has an equivalent weight from about 1,250 to 10,000.

8. The polyurea foam prepared in accordance with claim 1.

9. The polyurea foam prepared in accordance with claim 2.

10. The polyurea foam prepared in accordance with claim 3.

11. The polyurea foam prepared in accordance with claim 4.

12. The polyurea foam prepared in accordance with claim 5.

13. The polyurea foam prepared in accordance with claim 6.

14. The polyurea foam prepared in accordance with claim 7.

15. The process of claim 1 wherein the reaction mixture includes one or more polyols.

16. The process of claim 15 wherein at least one of the polyols in the reaction mixture is a polymer/polyol.

17. The process of claim 1 wherein the reaction mixture includes one or more primary amines.

18. The process of claim 17 wherein at least one of the primary amines in the reaction mixture has an amine equivalent weight in excess of 1500.

19. The process of claim 17 wherein the reaction mixture also includes one or more polyols.

20. The process of claim 19 wherein at least one of the polyols in the reaction mixture is a polymer/polyol.

21. A process for the preparation of polyurea foams which process comprises:
(a) forming a reaction mixture of an amine mixture and an organic isocyanate,
(b) reacting the amine mixture with the organic isocyanate in the presence of a catalyst, water and a foam stabilizer, and
(c) allowing the reaction mixture to rise and cure to form a polyurea foam wherein the amine mixture is of the general formula:

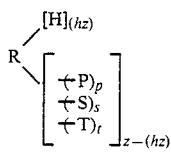

wherein
R represents an initiator radical based on a compound containing Zerewitinoff active hydrogen atoms;
H represents a hydroxy-containing group fo the formula:

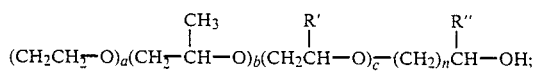

P represents a primary amine-containing group of the formula:

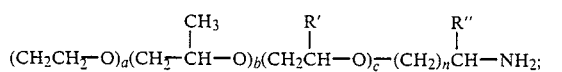

S represents a secondary amine-containing group of the formula:

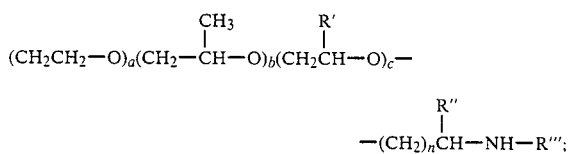

T represents a tertiary amine-containing group of the formula:

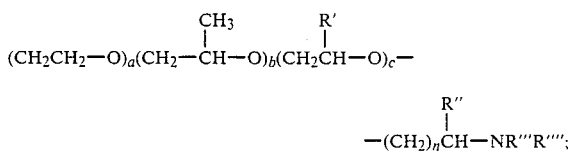

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.3;
p is from 0 to 0.4;
s is from 0.7 to 1.0;
t is from 0 to 0.05;
(hz) is the product of h and z;
p+s+t=1; and
z is 3 to 6.

22. The process of claim 21 wherein:
R contains from three to six carbon atoms,
a is 0 to 150,
b is 20 to 115,
c is 0 to 15,
R' is an alkyl group containing two carbon atoms, and
R''' contains from two to six carbon atoms.

23. The process of claim 22 wherein:
a is 0 to 90,
b is 25 to 98,
c is 0 to 2, and
R''' is an isopropyl group.

24. The process of claim 21 wherein R has a molecular weight of 18 to 400.

25. The process of claim 21 wherein R is

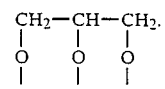

26. The polyurea foam prepared in accordance with claim 21.

27. The polyurea foam prepared in accordance with claim 22.

28. The polyurea foam prepared in accordance with claim 23.

29. The polyurea foam prepared in accordance with claim 24.

30. The polyurea foam prepared in accordance with claim 25.

* * * * *